United States Patent [19]
Bee et al.

[11] Patent Number: 5,372,154
[45] Date of Patent: Dec. 13, 1994

[54] SYSTEM FOR CLEANING THREADED PORTIONS OF TUBULAR MEMBERS

[75] Inventors: Robert Bee, 122 Gentry Cir., Lafayette, La. 70508; Pat Cummins, Lafayette, La.

[73] Assignee: Robert Bee, Lafayette, La.

[21] Appl. No.: 940,306

[22] Filed: Sep. 3, 1992

[51] Int. Cl.5 .............................................. B08B 3/02
[52] U.S. Cl. .................................. 134/110; 134/167 C; 134/170; 134/180
[58] Field of Search ............... 134/110, 167 R, 167 C, 134/168 R, 168 C, 170, 180, 181, 199, 200

[56] References Cited
U.S. PATENT DOCUMENTS

| | | | |
|---|---|---|---|
| 2,661,494 | 12/1953 | Crookston et al. | 15/387 |
| 3,306,310 | 2/1967 | Grant | 134/122 |
| 3,436,783 | 4/1969 | McCartney | 15/104.03 |
| 3,971,442 | 7/1976 | Scott | 166/315 |
| 4,011,617 | 3/1977 | Toelke et al. | 15/88 |
| 4,014,062 | 3/1977 | Scott et al. | 15/104.04 |
| 4,083,384 | 4/1978 | Horne et al. | 134/167 C X |
| 4,157,096 | 6/1979 | Miller, Jr. | 134/168 C X |
| 4,160,457 | 7/1979 | Dickson, Jr. et al. | 134/199 X |
| 4,403,363 | 9/1983 | Hess | 15/104.04 |
| 4,433,448 | 2/1984 | True | 15/88 |

Primary Examiner—Philip R. Coe
Attorney, Agent, or Firm—Pravel, Hewitt, Kimball & Krieger

[57] ABSTRACT

A system for cleaning both the box and pin ends of tubular members, recovery of the fluid residue, filtering of the residue to recover the heavy solids, and disposing of each of the components of the residue in an environmentally safe manner. A first housing positionable over the end of a tubular member; a first bladder expandable from the housing to seal around the outer wall of the tubular member; a plurality of jets positioned adjacent the threads of the tubular member, so that as the jets are rotated around the threads, a high pressure fluid spray cleans the threads of the member; a second bladder expandable from the end of the jetting means for sealing the inner bore of the member beyond the threads, so that all fluid jetted into the housing from the jetting nozzles is captured within the housing and flows from the housing, and no fluid flows beyond the threaded pipe end either along the inner or outer walls of the tubular member. The fluid is then collected, filtered, and the filtrate is disposed as wastewater, and the filters containing the filtered solid is placed in environmentally safe sealed containers for disposal.

10 Claims, 5 Drawing Sheets

SYSTEM FOR CLEANING THREADED PORTIONS OF TUBULAR MEMBERS

BACKGROUND OF THE INVENTION

1. Field of the Invention

The present invention relates to tubular members such as production tubing, production casing, or drill pipe, including other types of threaded pipe. More particularly, the present invention relates to a system for cleaning the pin and box ends of threaded tubular members by the use of a high-pressure fluid spray and collecting and filtering the fluid residue. Further, the system allows the separation of the solid components from the residue, so that the solids and filtered fluid are disposed of in an environmentally safe manner.

2. General Background

In the field of threaded connections of pipe, such as drill pipe and production casing, or the like, tubular members are formed into a "string" by the threaded connection between sections of pipe. Normally, as with drill pipe and casing, there is formed a threaded joint between a pin end of a first pipe section, where the threads are exposed on the outer wall of the end of the tubular member, and the box end of the adjoining 0 member, where the threads are formed on the inner wall of the end of the casing. Although the threads are milled to very close tolerances, it is required, in order to insure a connection which will seal properly, that a fluid, often containing heavy metals, such as lead, be placed on the threads, so that the connection, when completed is leakproof. In addition, the threads of the adjoining sections of the tubular members often become coated with the fluids which are pumped down the borehole, for example, during production of a well, or during drilling, which likewise contain heavy solids due to the nature of the fluid.

It is imperative that following the retrieval of the "string" from the hole, and the disconnecting of each section of pipe, that prior to placing the sections of pipe back into operation, that both the box and pin ends of each pipe section be carefully cleaned to insure that no residue remains from the previous use that the pipe had been put to.

At the present time, governmental regulations require that when the ends of the pipe are cleaned, and there may result in a fluid residue containing the heavy solids which coated the ends of the pipe section, that the residue be recovered in such a manner so that the surrounding environment, such as ground and water, not be contaminated with the residue. Therefore, for example, if the cleaning of the tubular members takes place in a storage area, where the pipe members may be placed on pipe racks, if any cleaning of the ends of the pipe members take place, then any fluid which is utilized in the cleaning, must be recovered, since it cannot be allowed to fall onto the ground or run into nearby water sources.

Oftentimes, in the present state of the art, in an effort to capture the fluid residue, absorption mats are placed beneath the pipe end, so that any fluid which runs from the pipe end will fall onto the mat and be absorbed into the mat. The mats are then collected and disposed of. However, quite often, the sections of pipe are placed on the pipe racks in such a manner that the distal end of the pipe, i.e., that end not being cleaned, is lower than the end being cleaned. Therefore, any fluid which would flow into the pipe bore, would naturally run through the length of the pipe, and would flow out of the distal end onto the ground below. It is therefore necessary, that a system be developed which will capture all of the residual fluid which may result from the cleaning process, and prevent any flow of fluid beyond the pipe end being cleaned.

Although that solves one problem, another problem becomes the disposal of the residual fluid, containing the heavy metals, which is accumulated from the cleaning of numerous sections of pipe. Under current regulations, this fluid cannot simply be dumped into a fluid "pit" since such pits are no longer authorized to be contaminated with heavy metal to prevent contamination of local drinking water sources. Therefore, the fluid should be hauled off and disposed of at a distant, authorized site. That process then requires that the fluid be transported via public roads which again may create a hazard should an accident occur during transit. There, there becomes a need to properly dispose of the contaminated fluid on site, so that these hazards are avoided.

A search of the art resulted in the retrieval of several references which are pertinent and which have been made of record in the accompanying Statement of the Art.

SUMMARY OF THE PRESENT INVENTION

The system of the present invention solves the aforesaid problems confronted in the art in a straightforward manner. What is provided is a dual system for cleaning both the box and pin ends of tubular members, recovery of the fluid residue, filtering of the residue to recover the heavy solids, and disposing of each of the components of the residue in an environmentally safe manner. What is provided is a first housing positionable over the end of a tubular member; a first bladder expandable from the housing to seal around the outer wall of the tubular member; a plurality of jets positioned adjacent the threads of the tubular member, so that as the jets are rotated around the threads, a high pressure fluid spray cleans the threads of the member; a second bladder expandable from the end of the jetting means for sealing the inner bore of the member beyond the threads, so that all fluid jetted into the housing from the jetting nozzles is captured within the housing and flows from the housing, and no fluid flows beyond the threaded pipe end either along the inner or outer walls of the tubular member.

There is further provided a series of filters to filter the solids contained in the fluid residue, so that following the filtration of the fluid, the fluid is collected free of heavy solids, as waste water, and can be disposed of in a waste water pit, and the heavy solids are contained in the filter mediums, sealed in an environmentally approved container, and disposed of by the customer as required in the regulations.

Therefore, it is a principal object of the present invention to provide a system for cleaning solid residue off of threaded portions of tubular members by capturing the entire fluid residue during cleaning, an avoiding contact with the surrounding environment;

It is a further principal object of the present invention to provide a system of collecting, filtering and disposing of the fluid residue, on site, so that the fluid is disposed of as waste water, and the heavy solids are disposed of in environmentally approved containers;

It is a further object of the present invention to provide a system of cleaning both the pin and box ends of threaded tubular members with a fluid medium, avoiding any non-fluid contact with the threads of the member during cleaning; and It is a further object of the present invention to provide a system of cleaning pipe members while in a substantially horizontal position, and avoiding any of the fluid residue from making contact with the surrounding environment by draining off from cleaning site.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
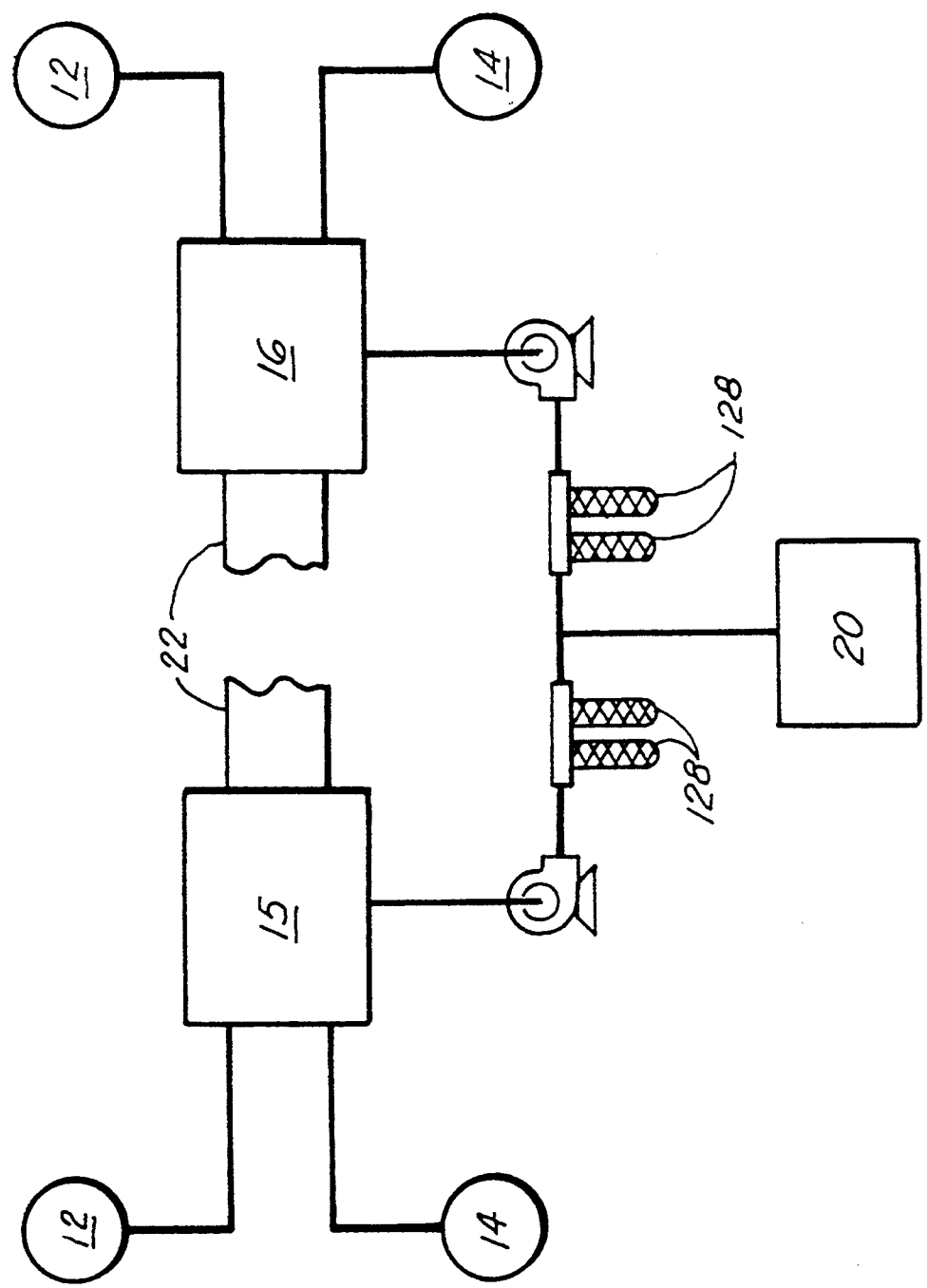
FIG. 1 illustrates an overall schematic of the cleaning system of the preferred embodiment of the present invention.

FIGS. 1 through 6B illustrate the preferred embodiment of the present invention. As illustrated in the system drawing in FIG. 1, the system generally comprises a water source tank 12, an air source 14, a cleaning component 15 for the box end of a tubular member 22, a cleaning component 16 for the pin end of a tubular member 22, filter means 18, and a waste water collection means 20. As was stated earlier, the system is provided to clean threaded portions of tubular members, such as drill pipe, production casing, or any type of member which is interconnected to other members through threaded connections, such as a box and pin connection. Although the system in FIG. 1 is illustrated operating on both ends of the tubular member 22, in most cases, each end of the member 22 would be cleaned separately.

Figures 2, 6:
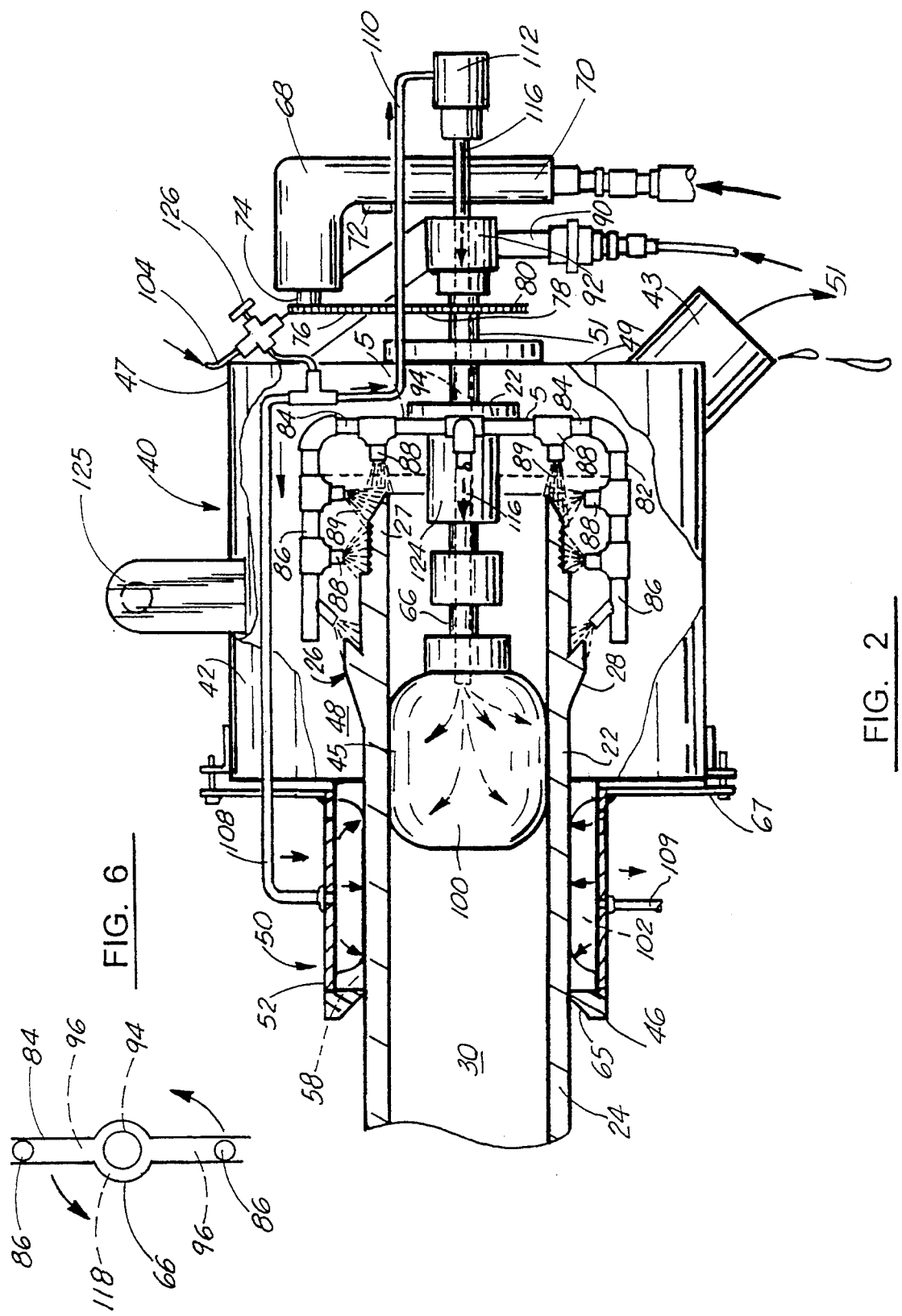
FIG. 2 illustrates a cross-section view of the cleaning system of the pin end of a tubular member in the preferred embodiment of the present invention.
FIG. 6 illustrates in cross-section view the air and fluid lines in the preferred embodiment of the present invention.
Figure 3:
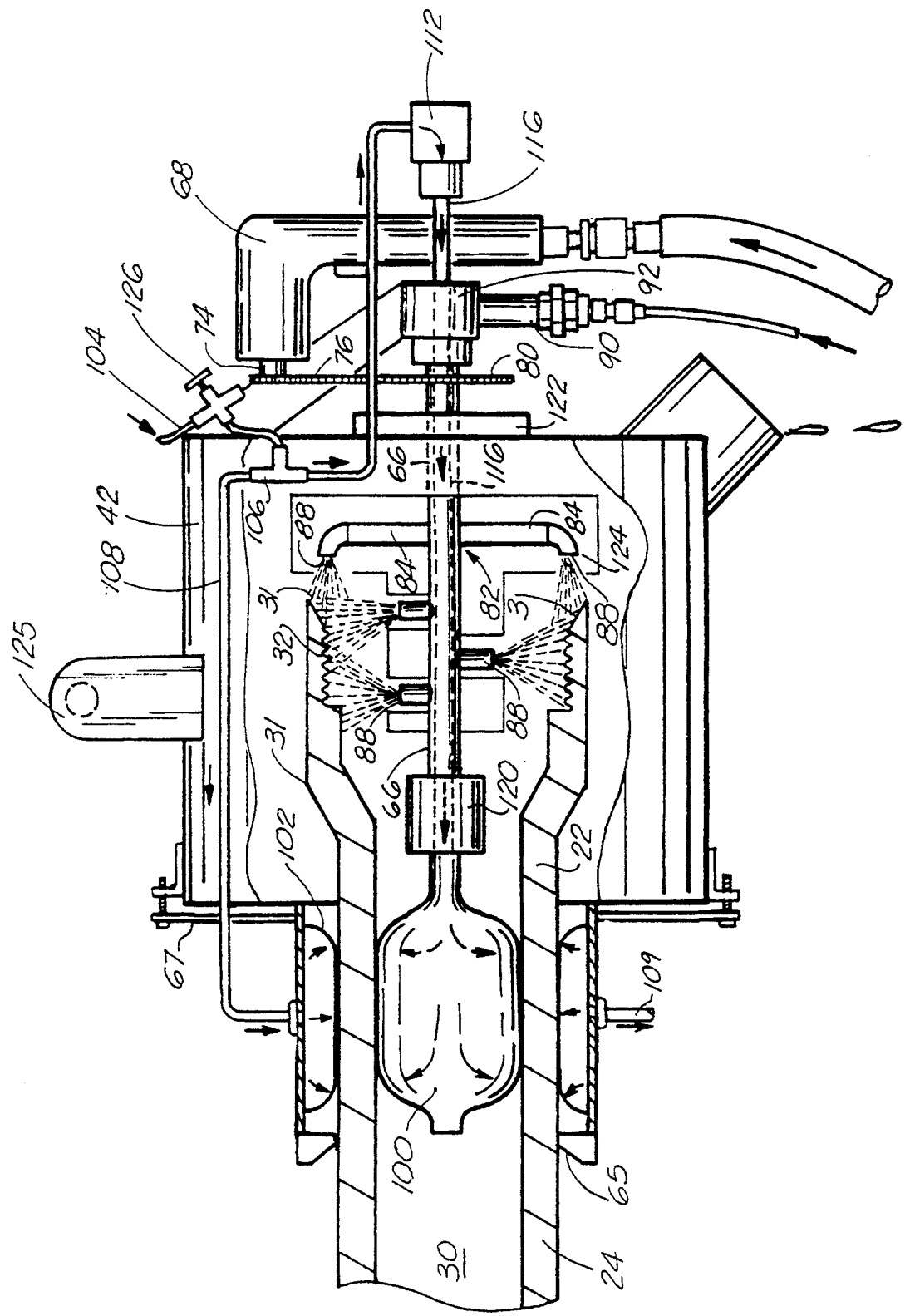
FIG. 3 illustrates a cross-section view of the cleaning system of the box end of a tubular member in the preferred embodiment of the present invention.

As seen in FIGS. 2 and 3, there is illustrated a tubular member 22 of the type which would undergo the cleaning process. Member 22 comprises a generally elongated body portion 24, having a first threaded "pin" end 26 (FIG. 2), wherein threads 28 appear on the outer wall of the member, and a second "box" end (FIG. 3), wherein the body has an enlarged end 31, for accommodating the pin end 26 thereinto, the box end 31 having threads 32 on its inner wall, which would threadably engage the threads 28 of the pin end 26. Likewise, the tubular member 22 would further comprise a bore 30 throughout its length so that fluid or the like may travel through bore 30 when the members are threadably engaged end to end.

Due to the different structural features of the pin and box ends 26, 31, the system of the present invention would comprise a first cleaning means 40 for cleaning the pin end 26, and a second cleaning means 60 for cleaning the box end 31 of the member. A discussion will be had on each of these cleaning means, as illustrated in FIGS. 2 and 3 respectively.

Turning first to cleaning means 40, there is provided an outer housing 42, having an annular wall 44, LO and a first open end 46, so that housing 42 can be placed over the pin end 26 of tubular member 22 as illustrated in the Figure. As seen, the diameter of housing 42 is such that it is spaced apart from the wall 45 of the tubular member 22 over which housing 42 is inserted during the cleaning process defining an annular space 48 therebetween. The second end 47 of housing 42 is closed via a rear wall 49, into which the cleaning mechanism is secured to undertake the cleaning process. Since the housing 42 will capture all of the fluid being introduced into during the cleaning process, there is provided a fluid return outlet 43, on the lower portion of housing 42 to drain off the spent fluid (arrow 51) containing the solid wastes removed from the threads of the pipe, for undergoing further treatment in the process.

Figure 4:
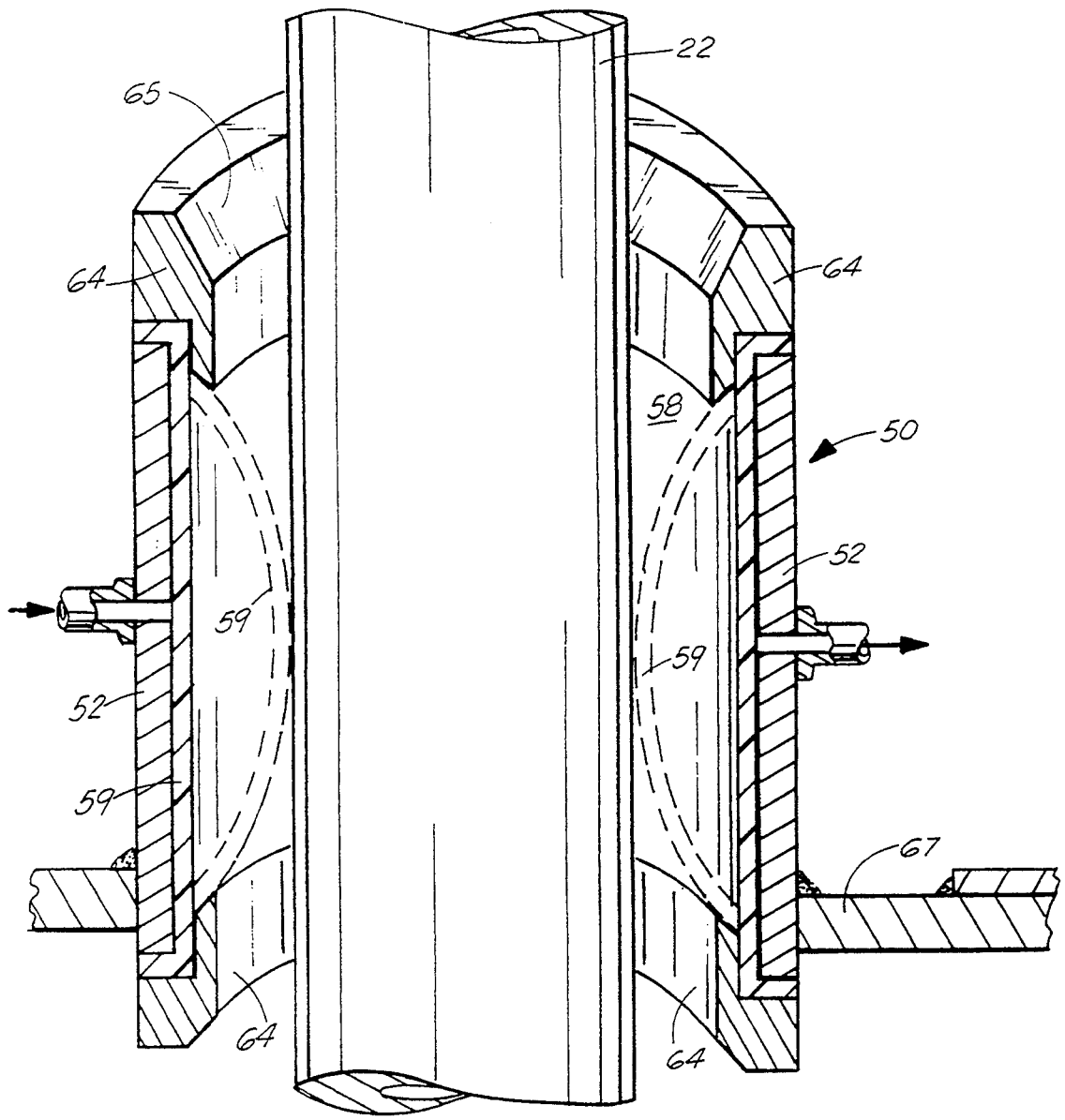
FIG. 4 illustrates a partial cross-section view of the cleaning system for cleaning a tubular member in the preferred embodiment of the present invention.
Figure 5A:
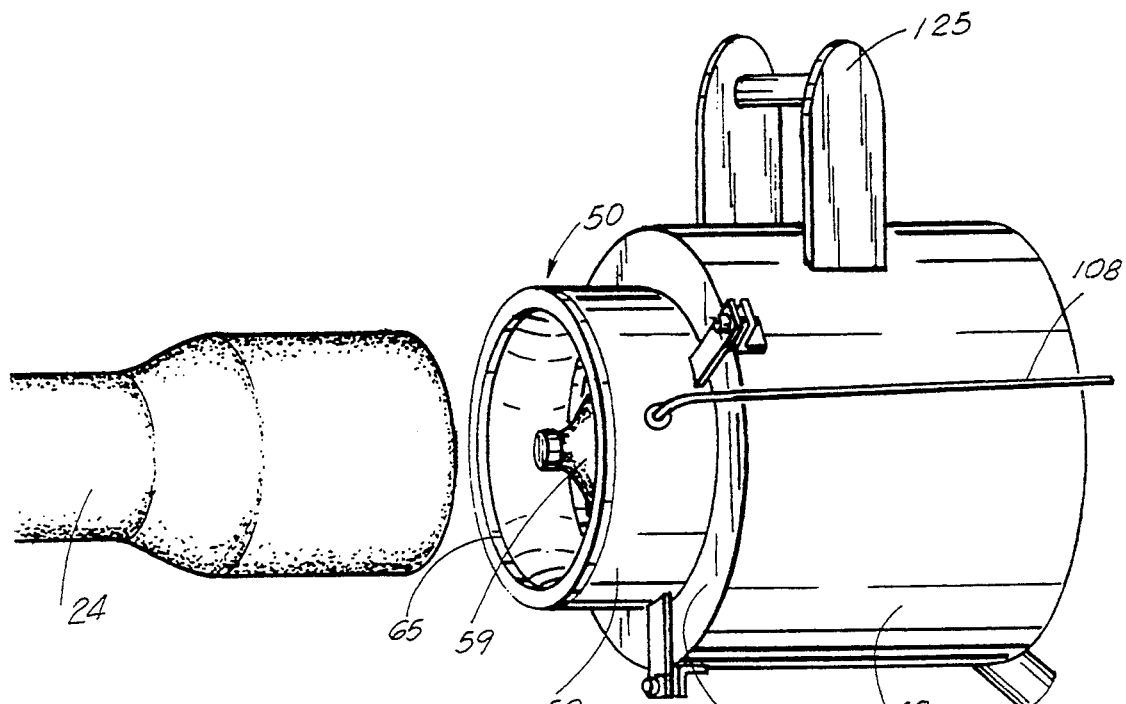
FIGS. 5A and 5B illustrate overall views of the housings used in the cleaning system of the preferred embodiment of the present invention.
Figure 5B:
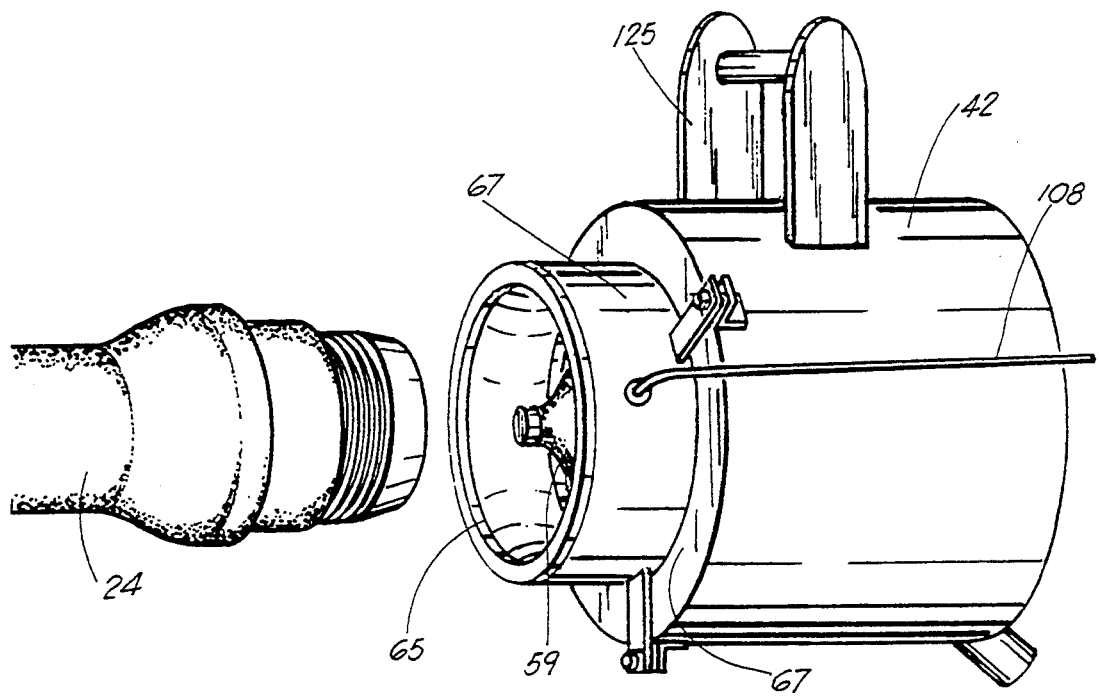

Prior to a discussion of the cleaning mechanism itself, reference is made to FIG. 4 which illustrates in detail the sealing feature of housing 42 after it is placed around member 22. As illustrated, the annular housing 42 further comprises a pipe sealing means 50 formed to encircle the pipe member 22, having an outer wall 52 for defining a space 58 for accommodating tubular member 22 therein. The wall 52 would be constructed of a lightweight material, such as aluminum or the like and would be substantially rigid in nature. There would be provided a flexible member 59, such as rubber or the like, spanned against the inner surface of wall 52 as seen in FIG. 4, and would define an expandable bladder means 102, as will be discussed further. As illustrated the flexible member 59 would be helped in place by upper and lower retainer rings 64 would be secured in place, so that the flexible member 59 would be securely held in place, and able to seal against leaks from fluid entering the channel space 58 during operation. In addition, upper retainer ring 64 would have a beveled shoulder 65 which would serve as a means for guiding the end of pipe member 22 into space 58 which would reduce any type of damage which may be done to the end of the pipe should it strike member 64. In addition, the member 64 would be constructed of a material which would be somewhat able to absorb any impact which the threaded portion of the member 22 would have should it strike member 24. Further, it should be noted the lower end of the outer pipe sealing means 50, there would be provided a shoulder 67 welded onto the outer pipe sealing means 50, so that pipe sealing means 50 could be engaged to the housing 42 as illustrated in FIGS. 5A and 5B.

Turning now to the cleaning portions of the system, reference is made first to FIG. 2 which illustrates in cross section view the portion for cleaning a pin end 26 of a tubular member 22 of the type previously discussed. As seen in FIG. 2, the pin end 26 of tubular member 22 is shown having been inserted into the housing 42 with the furthest most end 27 of pin end 26 positioned near the rear wall 49 of housing 42. Upon the positioning of the tubular member 22 within housing 42 there is illustrated the means for sealing off the interior bore 33 of member 22 and sealing off around the outer wall of member 22. Likewise, there is illustrated the means for introducing fluid under pressure against the threads 28 of pin end 26 of member 22. Since these two means are substantially carried by the same structure, they will be discussed together.

As seen in FIG. 2, there is illustrated a central shaft 66 extending from outside the rear wall 49 and through a bore 51 in the rear wall 49 and into the central portion of the housing 42. Shaft 66 is driven by a pneumatic drive gun 68 positioned on the outside of housing 42, and including a handle portion 70, a trigger 72 and a drive shaft 74 so that a gear 76 drives a drive chain 78 which engages a main drive gear 80 around central shaft 66, so that as the shaft in gun 68 is driven, this imparts rotation to central shaft 66 within housing 42. On the interior of housing 42 and secured to shaft 66 is a fluid cleaning means 82 which comprises a plurality of first arm members 84 extending outward perpendicularly from shaft 66 and forming right angles to a second pair of arms 86 extending from arm members 84 with second arms 86 spaced apart from the threads 28 on pin end 26 of member 22. The first and second arm portions 84, 86 further comprise a plurality of jet nozzles 88 so positioned so that when fluid is emitted from nozzles 88 under pressure (lines 89), the fluid makes contact with all threads on the pin end 26 of member 42. In order to achieve uniform cleaning, the arms 84, supported on central shaft 66 are rotated upon the rotation of central shaft 66 imparted by pneumatic drive gun 68. As illustrated, the entire housing 42 and related components would be generally hand held by an upper handle 125, and the pneumatic gun 68.

The fluid which is used in the cleaning of threads 28, is obtained, as seen in FIG. 2, by running a fluid entry line 90 via a water swivel 92 then into a bore 94 0 within central shaft 66. The bore within shaft 66 is in fluid communication with a bore 96 in arms 84 where the fluid travels to then exit the jet nozzles in arms 88. The fluid is introduced under high pressure, and may be near the boiling point of water, and at times, if necessary, may contain certain cleaning compounds as the case may be. The swivel 92 is required, since the rotation of shaft 66 requires that swivel 92 be there to allow water to flow from the water line 90 into bore 94 of shaft 66.

As was stated earlier, the introduction of water or other fluid into the system accomplishes the task of cleaning the threads 28 of member 22. However, an additional crucial feature, is the means to capture the fluid that is draining off from the cleaning process. This means requires that a first bladder 100 positioned within the bore 30 of member 22 be inflated to form a seal around the inner wall of member 22, and a second bladder 102 be inflated to form a fluid tight seal around the outer wall of member 22, both bladders 100, 102 positioned along member 22 so that the fluid may flow and be captured within the space 48 of housing 42. In order to accomplish this, there is provided an air entry line 104 wherein pressurized air is introduced into a common "T" line 106 by the opening of a valving member 126. The "T" line branches off into a first branch 108. This branch 108 extends to and feeds into the annular space formed by the wall of housing 42 and second bladder 102 as was discussed previously in reference to FIG. 4. Upon introduction of air into this space, the pressurized air will cause an expansion of bladder 102 until bladder 102 is in sealing engagement around the outer wall of pipe member 22 as seen in the expanded state in phantom view in FIG. 2. After the cleaning is complete, bladder 102 would be deflated, and the air would exit via line 109 as seen in FIG. 2.

Simultaneously, common "T" line 106 will form a second branch line 110 which will feed into the central shaft 66 as previously identified. In order to accommodate the line 110 into shaft 66, which rotates during the cleaning process, there is provided an air pressure swivel 112 at the distal end of shaft 66 for introduction of air. Since the inner bore 94 of central shaft 66 will have heated fluid or water coursing through it during cleaning, the pressurized air will be directed through the bore of shaft 66 via a small central air line 16, so that there is provided an annular space 118 between the wall of central shaft 66 and the outer wall of central air line 116, with the hot water accommodated in that annular space. Reference is made to FIG. 5 which illustrates in cross-section view, the main shaft 66 housing the inner air line 116, with shaft 66 directing fluid into the arms 84 and onto nozzles 88.

At the end of central air line 116 as it exits the end of central shaft 66 within housing 42, there is provided the first bladder 100, which would be deflated and positioned within the bore 30 of member 22 at a point beyond the threads 32 of the member 22. Upon the introduction of air into bladder 100, the bladder is inflated, as seen in FIG. 3, with the wall of the inflated bladder sealingly engaging around the inner wall of pipe member 22. Likewise, since the bladder 100 must not be rotating when shaft 66 is rotated during cleaning, there is provided a second air swivel 120 at the connection between line 116 and bladder 100 so as to preclude rotation of bladder 100 when shaft 66 is rotated.

It should be noted that there are provided the proper seals so that when fluid is introduced via shaft 66 into the housing 42, there is provided an exterior main housing seal 122 and, on the interior of the rear wall 49 of housing 42 there is provided a protective nylon backstop 124, so that upon introduction of pipe member 22 into housing 42, the end of pipe 22 will not inadvertently strike the rear wall 49 of housing 42 and damage the threads 32 of pipe member 42.

As was stated earlier, the system would include means for cleaning both the pin and box ends of tubular members. Although the previous discussion has been directed to the pin end 26 of a tubular member 22, reference is made to FIG. 3 for a discussion of the means for cleaning the box end 31 of a member 22. As seen in the Figure, the components for cleaning the box end 30 are substantially similar to the components discussed in FIG. 2. These include the housing 42 encircling the box end 31, the first bladder 100 within the base of the member 22, the second bladder 102 in the surrounding member 22, the pneumatic drive gun 68, the central shaft 66 housing the fluid flow and the air line 116 for flowing pressurized air to the first bladder 100.

The structural component which differs from the cleaning means for cleaning the pin end 26, is the configuration and positioning of the nozzles 88 on the fluid cleaning means 82. As seen, the nozzles 88 in FIG. 3 are positioned to direct pressurized fluid against the inner wall of the box 31 of member 22 since the threads are interior, rather than exterior as on the pin end 26. There is provided the first set of arms 84 radiating outward from shaft 66 and including a nozzle 88 on each end, for directing a pressurized fluid spray substantially against the machine face 33 of box end 31. It should be noted in FIG. 3 that there is provided a nylon protective backstop 124 which extends forward from the rear wall 49 of housing 42, to a point further outward than the nozzles 88. Therefore, when the housing 42 is positioned onto member 22, the face 33 of the box 31 will not strike the nozzles 88 which could cause damage to the face 33 of the box 31. The remainder of the nozzles 88 are positioned along the outer wall of central shaft 66 for directing a pressurized fluid spray directly outward against the threads 32 within the box end 31 of the member. These nozzles would be arranged so that despite the types of threads which are provided within the box end, spray from the nozzles would clean the threads, through the rotation of the central shaft 66 as previously discussed.

Method of the Present Invention

The method of carrying out the present invention would be the same for both the box end or the pin end of a tubular member. The housing 42, is positioned upon the end of a length of tubing 22, by manually inserting the housing 42 around the member 22 by holding upper handle 125 and the handle 125 of pneumatic gun 68. The housing is inserted until the face 31 of the member may make contact with the protective stop 124 in the housing, and then backed off a slight bit. Next, a valving member 126 is opened to allow pressurized air to flow from the principal air line 104 and into the two branch lines 108, 110 to inflate the bladders 100 and 102 simultaneously, thus assuring that no fluid will flow beyond the expanded bladders.

An important feature of the expanded bladders, in addition to the fact that they seal against fluid flow out of housing 42 (other than out of fluid return outlet 43). The bladders, when inflated, serve as a means to centrally position tubular member 22 within housing 42. This is crucial, since when held in place by the inner and outer bladders, the threads being cleaned cannot make contact with the rotating nozzle heads which could damage the delicate threads. This manner assures that the pipe will be maintained separate and apart from the threads, and the only thing making contact with the threads during cleaning is the fluid spray, itself.

Continuing with the method of the present invention, following the .inflation of the bladders 100, 102 around and within pipe 22, and thus positioning the member centrally within housing 42, the fluid is introduced, under pressure, into the fluid flow line of the central shaft 66, and emitted from the various nozzles 88, whether it be the box or pin end system in place. The pneumatic gun 68 is then activated, and the central shaft 66 is rotated, thus imparting a continuous and uninterrupted flow of pressurized cleaning fluid against the entire set of threads on the member, effectively washing off the solid and fluid residues from the threads.

Following the cleaning, the pneumatic gun 68 is shut off, the water flow is stopped, and the bladders 100, 102 are allowed to deflate. Upon deflation, the housing 42 is removed from the cleaned pipe member 22, and then inserted into the next member to be cleaned. It should be noted that an important feature of the deflation of the bladders is the fact that when the bladders deflate, and retract away from the pipe walls, when the housing is removed, the deflated bladders make no contact with the pipe threads. This is important since the bladders may well have solid residue thrown against them during washing, and as such, were they to make contact with the threads, could effectively contaminate the threads with the residue. The cleaning would therefore be ineffective.

As was stated earlier, during the cleaning process the bladders restrict any flow of the cleaning fluid beyond the expanded bladders, and restrict it to the housing. The fluid is drained from the housing via the fluid return outlet 43. At that point the fluid is pumped through a series of filters 128 which filter out particulates to a desired micron size, so that the filtrate remaining is substantially classified as waste water, which can be then carried away from the cleaning site, and within environmental guidelines, dumped into wastewater pits, or the like. Likewise, the materials trapped within the filter medium are often time environmentally destructive heavy metals, such as lead or zinc, and others which may be present such as copper or graphite, which must be treated differently. Therefore, it is foreseen that the filters 128, containing the metals filter residue would be placed within EPA approved sealed containers, and turned over to the customer, so that the customer could dispose of the wastes in the proper manner. This would eliminate the filtered material from being carried on the highway, or being dumped with the wastewater, which is prohibited by current regulations. The following table lists the part numbers and part descriptions as used herein and in the drawings attached Table of terms
water tank 12
cleaning component 14, 16
filtering means 18
collection means 20
tubular member 22
body portion 24
"pin" end 26
furthest end 27
threads 28
"box" end 30
machine face 31
threads 32
bore 33
first cleaning means 40
outer housing 42
fluid return outlet 43
annular wall 44
first open end 46
wall 45
annular space 48
second end 47
rear wall 49
fluid return outlet 43
pipe sealing means 50
outer wall 52
annular space 58
flexible member 59
second cleaning means 60
retainer ring 64
beveled surface 65
central shaft 66
plate member 67
bore 51
pneumatic drive gun 68
handle portion 70
trigger member 72
drive shaft 74
gear 76
drive chain 78
drive gear 80
fluid cleaning means 82
first arm members 84
second arm members 86
jet nozzles 88 fluid entry line 90
water swivel 92
central shaft bore 94
arms' bore 96
first bladder 100
second bladder 102
air entry line 104
common "T" line 106
first branch line 108
air exit line 109
second branch line 110
air pressure swivel 112
central air line 116
annular space 118
second air swivel 120
exterior main housing seal 122
protective nylon stop 124
handle 125
valving mechanism 126
filters 128

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for cleaning the threaded end of a tubular member of the type having a continuous bore therethrough, and having at least a first end portion with threads around a portion of the inner wall of the member, the system comprising:
   a) cleaning means insertable into the bore of the tubular member at its first end portion for emitting a pressurized fluid spray against the threads on the inner wall of the member;
   b) at least a first expandable sealing means positioned within the bore of the member at its first end portion, for preventing the fluid spray from entering the bore of the member beyond the position of the sealing means within the bore;
   c) a housing positioned around the first end of the member for catching the sprayed fluid flowing from the bore of the member;
   d) second expandable sealing means between the wall of the housing and the exterior wall of the first end of the tubular member, for maintaining the fluid sprayed against the threads of the member within the housing; and
   e) means for conveying the fluid from the housing to prevent the fluid from flowing out of the housing and into the surrounding environment.

2. The system in claim 1, wherein the first expandable sealing means positions the tabular member centrally within the housing to prevent contact between the threads of the member and the first cleaning means.

3. The system in claim 1, further comprising filtering means to filter the fluid flowing out of the housing and to capture the heavy solids within the fluid so that the filtered fluid is substantially wastewater.

4. The system in claim 3, further comprising an EPA-approved sealed container for disposing the solid waste separately from the filtered waste water.

5. The system in claim 1, wherein the cleaning means comprises in part a plurality of nozzles which are rotated within the end of the tubular member to emit the pressurized fluid against the threads of the member.

6. The system in claim 1, further comprising an air inlet for introducing air to expand the sealing means against the wall of the tubular member.

7. The system in claim 1, further comprising a pneumatic drive gun for imparting rotation to the means for cleaning the threads of the tubular member.

8. A system for cleaning the threaded end of a tubular member of the type having a continuous bore therethrough, and having first and second end portions, at least said second end portion having threads around a portion of the outer wall of the tubular member, the system comprising:
   a) cleaning means positioned around the threads of the second end of the tubular member for emitting a pressurized fluid spray against the threads of the tubular member;
   b) a housing positioned around the second end of the member for catching the sprayed fluid sprayed against the threads of the member;
   c) at least a first bladder inflated between the wall of the housing and the exterior wall of the second end of the tubular member for maintaining the fluid sprayed against the threads of the member within the housing; and
   d) means for conveying the fluid from the housing to prevent the fluid from flowing out of the housing and into the surrounding environment.

9. The system in claim 8, wherein said cleaning means further comprises a plurality of nozzle members rotating around the end of the tubular member for emitting a pressurized fluid spray against the exterior threads of the tubular member.

10. The system in claim 8, further comprising a second sealing means positioned within the bore of the member at its first end portion for preventing the fluid spray from entering the casing bore beyond the position of the sealing means.

* * * * *